(12) United States Patent
Gao et al.

(10) Patent No.: US 12,550,093 B2
(45) Date of Patent: Feb. 10, 2026

(54) TERMINAL REGISTRATION PROCESSING METHOD AND DEVICE

(71) Applicant: ZTE Corporation, Shenzhen (CN)

(72) Inventors: Minggang Gao, Shenzhen (CN); Qingyu Ni, Shenzhen (CN); Dan Li, Shenzhen (CN); Xuemei Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 405 days.

(21) Appl. No.: 17/927,967

(22) PCT Filed: May 26, 2021

(86) PCT No.: PCT/CN2021/096169
§ 371 (c)(1),
(2) Date: Nov. 28, 2022

(87) PCT Pub. No.: WO2021/239009
PCT Pub. Date: Dec. 2, 2021

(65) Prior Publication Data
US 2023/0217400 A1 Jul. 6, 2023

(30) Foreign Application Priority Data
May 26, 2020 (CN) .......................... 202010457896.1

(51) Int. Cl.
*H04W 60/00* (2009.01)
*H04W 8/18* (2009.01)

(52) U.S. Cl.
CPC ........... *H04W 60/00* (2013.01); *H04W 8/183* (2013.01)

(58) Field of Classification Search
CPC ....... H04W 12/06; H04W 12/35; H04W 4/60; H04W 12/43
See application file for complete search history.

(56) References Cited

U.S. PATENT DOCUMENTS

| | | | |
|---|---|---|---|
| 2008/0255992 A1* | 10/2008 | Lin ........................ | G06Q 40/02 705/44 |
| 2011/0028126 A1* | 2/2011 | Lim ...................... | H04W 12/06 455/411 |

(Continued)

FOREIGN PATENT DOCUMENTS

| | | | |
|---|---|---|---|
| CN | 102025741 A | * | 4/2011 |
| CN | 105578590 A | | 5/2016 |

(Continued)

OTHER PUBLICATIONS

European Search Report for corresponding application EP21812815; Report dated Nov. 2, 2023.

(Continued)

*Primary Examiner* — Khalid W Shaheed
(74) *Attorney, Agent, or Firm* — CANTOR COLBURN LLP (57) ABSTRACT

A terminal registration processing method and device are provided. The method includes: detecting that an identity card is inserted into at least one card slot; reading an identifier of the identity card; acquiring, from a database, a network identity corresponding to the identifier, wherein the database stores a correspondence between a network identity and an identifier of a registered card; and registering the identity card according to a result of acquiring the network identity.

18 Claims, 5 Drawing Sheets

(56) References Cited

U.S. PATENT DOCUMENTS

| | | | | |
|---|---|---|---|---|
| 2013/0227137 A1* | 8/2013 | Damola | ................. | H04L 47/78 |
| | | | | 709/224 |
| 2016/0134624 A1* | 5/2016 | Jacobson | ................ | H04W 4/02 |
| | | | | 726/4 |
| 2018/0131730 A1 | 5/2018 | Leis et al. | | |
| 2020/0245404 A1* | 7/2020 | Suh | ...................... | H04W 60/00 |

FOREIGN PATENT DOCUMENTS

| | | |
|---|---|---|
| CN | 105682217 A | 6/2016 |
| CN | 107094303 A | 8/2017 |
| CN | 107371234 A | 11/2017 |
| CN | 108207019 A | 6/2018 |
| CN | 109207019 A | 6/2018 |
| CN | 108513287 A | 9/2018 |
| CN | 109379779 A | 2/2019 |
| CN | 105636171 B | 5/2019 |
| WO | 2020095617 A1 | 5/2020 |

OTHER PUBLICATIONS

Chinese Office Action; Application No. 202010457896.1; date of mailing: Jul. 18, 2024; 16 pages.
Chinese Search Report; Application No. 2020104578961; Filing Date: May 26, 2020; 6 pages.
International Search Report for corresponding application PCT/CN2021/096169 filed May 26, 2021; Mail date Jul. 30, 2021.

* cited by examiner

TERMINAL REGISTRATION PROCESSING METHOD AND DEVICE

CROSS REFERENCE

This application is a National Stage Filing of the PCT International Application No. PCT/CN2021/096169 filed on May 26, 2021, which claims priority to Chinese Application No. 202010457896.1 filed on May 26, 2020, the entirety of which is herein incorporated by reference.

TECHNICAL FIELD

Embodiments of the present disclosure relate to the field of communications, and in particular, to a terminal registration processing method and device.

BACKGROUND

With the rapid development of the Fifth Generation communication technologies (5G), a new network construction trend emerges and develops, and multi-card terminals, such as dual 5G dual-card terminals and single 5G dual-card terminals, are more and more attracting people's attention. In the future, the dual-card terminal will occupy main market share. There are many dual-card operations requiring attention, especially concerning how to determine a dual-card replacement and concerning migration of configurations. For example, the processing under a scenario relating to the Fourth Generation communication technologies (4G) & 5G dual-card replacement performed by a user needs to be optimized so as to improve the network access speed as much as possible and reduce the occupation of network resources.

According to the 3GPP specification, if a user replaces a Universal Mobile Telecommunications System (UMTS) Subscriber Identity Module (USIM) card, after detecting that a new card is inserted, the terminal will consider that parameters originally stored and related to an old card are useless, and therefore will delete these parameters. As such, during subsequent registration, such registration can only be performed based on an International Mobile Subscriber Identity (IMSI) or other identifiers of the new card, and the network side also needs to allocate all terminal identifiers to match the new card. During this process of allocating new identifiers, a lot of signaling interactions between network elements of the network side are involved, which not only requires a lot of resources of the network side, but also results in a relatively long registration time of the terminal. The above processing is generally supposed to be a normal behavior, but may result in some problem in a scenario of pseudo-card-replacement after the introduction of a dual card.

For example, a user holds cards provided by China Unicom and China Telecom respectively, the card provided by China Unicom is originally inserted into card slot 1, and the card provided by China Telecom is originally inserted into card slot 2. However, the user takes out the two cards for some reason with the help of a card needle, the user does not bother to memorize the original placement order of the two cards and happens to place the two cards in a reverse order, that is, card slot 1 now holds the card provided by China Telecom, and card slot 2 now holds the card provided by China Unicom. In such a case, each modem module corresponding to the terminal finds that the card corresponding to itself changes, thus deletes corresponding stored identifier information which is previously allocated, deems both cards as new cards, and requests the network to allocate all the required identifiers for the two cards according to a registration process of new cards, which increases burden on the network. However, the user merely changes the placement order of the two cards without introducing any new card, and this situation is hereinafter referred to as pseudo-card-replacement.

Aiming at the problem in the related art that in a pseudo-card-replacement scenario of a dual-card terminal or a multi-card terminal, a registration process of new cards is adopted to request the network to allocate all identifiers, which increases burden on the network, no solution has been proposed.

SUMMARY

Embodiments of the present disclosure provide a terminal registration processing method and device, which can at least solve the problem in the related art that in a pseudo-card-replacement scenario of a dual-card terminal or a multi-card terminal, a registration process of new cards is adopted to request the network to allocate all identifiers, which increases burden on the network.

According to an embodiment of the present disclosure, provided is a terminal registration processing method, including:
  detecting that an identity card is inserted into at least one card slot;
  reading an identifier of the identity card;
  acquiring, from a database, a network identity corresponding to the identifier, wherein the database stores a correspondence between a network identity and an identifier of a registered card; and
  registering the identity card according to a result of acquiring the network identity.

In at least one exemplary implementation of the embodiment, registering the identity card according to the result of acquiring the network identity includes:
  in a case where the result indicates that the network identity corresponding to the identifier is successfully acquired, determining that the identity card is a registered card, and registering the identity card according to the network identity corresponding to the identifier; and/or,
  in a case where the result indicates that the network identity corresponding to the identifier is not successfully acquired, determining that the identity card is an unregistered card, and registering the identity card according to the identifier.

In at least one exemplary implementation of the embodiment, registering the identity card according to the network identity corresponding to the identifier includes:
  sending a registration request message to a network side, wherein the registration request message carries the network identity corresponding to the identifier.

In at least one exemplary implementation of the embodiment, registering the identity card according to the identifier includes:
  sending a registration request message to a network side, wherein the registration request message carries the identifier.

In at least one exemplary implementation of the embodiment, after registering the identity card according to the identifier, the method further includes:
  receiving an network identity allocated by the network side according to the registration request message; and storing, into the database, a correspondence between the identifier and the network identity allocated by the network side.

In at least one exemplary implementation of the embodiment, the identity card includes a Subscriber Identity Module (SIM) card or a Universal Mobile Telecommunications System (UMTS) Subscriber Identity Module (USIM) card.

In at least one exemplary implementation of the embodiment, the identifier is an International Mobile Subscriber Identity (IMSI);
in a case where the identity card is the SIM card, the network identity includes a Globally Unique Temporary Identity (GUTI) and a Key Set Identifier (KSI);
in a case where the identity card is the USIM card, the network identity includes a Fifth Generation-GUTI (5G-GUTI) and a KSI.

According to another embodiment of the present disclosure, provided is a terminal registration processing device, including:
a detection module, configured to detect that an identity card is inserted into at least one card slot;
a reading module, configured to read an identifier of the identity card;
an acquisition module, configured to acquire, from a database, a network identity corresponding to the identifier, wherein the database stores a correspondence between a network identity and an identifier of a registered card; and
a registration module, configured to register the identity card according to a result of acquiring the network identity.

In at least one exemplary implementation of the embodiment, the registration module includes:
a first registration sub-module, configured to, in a case where the result indicates that the network identity corresponding to the identifier is successfully acquired, determine that the identity card is a registered card, and register the identity card according to the network identity corresponding to the identifier; and/or
a second registration sub-module, configured to, in a case where the result indicates that the network identity corresponding to the identifier is not successfully acquired, determine that the identity card is an unregistered card, and register the identity card according to the identifier.

In at least one exemplary implementation of the embodiment, the first registration sub-module is further configured to:
send a registration request message to a network side, wherein the registration request message carries the network identity corresponding to the identifier.

In at least one exemplary implementation of the embodiment, the second registration sub-module is further configured to:
send a registration request message to a network side, wherein the registration request message carries the identifier.

In at least one exemplary implementation of the embodiment, the device further includes:
a receiving module, configured to receive an network identity allocated by the network side according to the registration request message; and
a storing module, configured to store, into the database, a correspondence between the identifier and the network identity allocated by the network side.

In at least one exemplary implementation of the embodiment, the identity card includes a SIM card or a USIM card.

In at least one exemplary implementation of the embodiment, the identifier is an IMSI;
in a case where the identity card is the SIM card, the network identity includes a GUTI and a KSI;
in a case where the identity card is the USIM card, the identifier is a Subscription Concealed Identifier (SUCI), and the network identity includes a 5G-GUTI and a KSI.

According to another embodiment of the present disclosure, provided is a computer-readable storage medium, wherein the computer-readable storage medium stores a computer program, and the computer program is configured to execute the operations in any one of the method embodiments at runtime.

According to another embodiment of the present disclosure, provided is an electronic device, including a memory and a processor, wherein the memory stores a computer program, and the processor is configured to run the computer program so as to execute the operations in any one of the method embodiments.

By means of the embodiments of the present disclosure, when detecting that an identity card is inserted into at least one card slot, an identifier of the identity card is read; a network identity corresponding to the identifier is acquired from a database, wherein the database stores a correspondence between a network identity and an identifier of a registered card; and the identity card is registered according to a result of acquiring the network identity. The technical solution can solve the problem in the related art that in a pseudo-card-replacement scenario of a dual-card terminal or a multi-card terminal, a registration process of new cards is adopted to request the network to allocate all identifiers, which increases burden on the network. For the pseudo-card-replacement scenario, a network identity of a registered identity card is stored, thereby reducing unnecessary signaling interaction in a network, and increasing efficiency and speed of registering a terminal to the network.

DETAILED DESCRIPTION

Embodiments of the present disclosure will be described below in detail with reference to the drawings and embodiments.

It should be noted that the terms "first" and "second" in the description, claims, and accompanying drawings of the present disclosure are used to distinguish similar objects, and are not necessarily used to describe a specific sequence or order.

Figure 1:
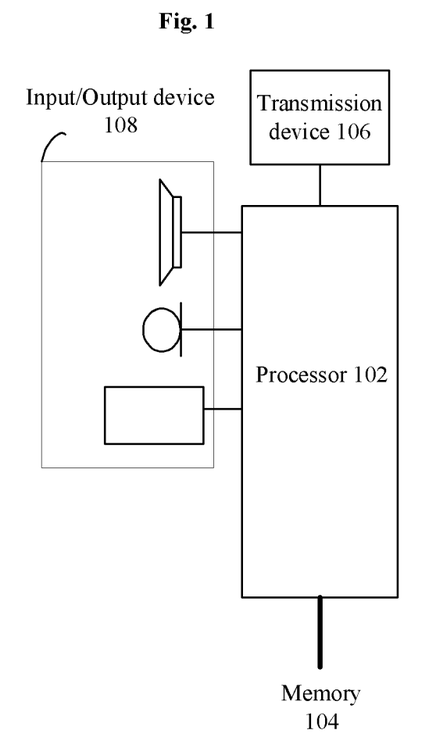
FIG. 1 is a hardware structural block diagram of a mobile terminal for implementing a terminal registration processing method according to an embodiment of the present disclosure.

The method embodiments provided in the embodiments of the present disclosure may be implemented in a mobile terminal, a computer terminal, or a similar computing device. Taking the operation on a mobile terminal as an example, FIG. 1 is a hardware structural block diagram of a mobile terminal for implementing a terminal registration processing method according to an embodiment of the present disclosure. As shown in FIG. 1, the mobile terminal may include one or more (only one is shown in FIG. 1) processors 102 (the processors 102 may include, but are not limited to, processing devices such as a Microcontroller (MCU) or a programmable logic device (such as a Field Programmable Gate Array (FPGA)) and a memory 104 for storing data, wherein the mobile terminal may further include a transmission device 106 and an input/output device 108 for a communication function. A person having ordinary skill in the art can understand that the structure shown in FIG. 1 is merely exemplary, which does not limit the structure of the foregoing mobile terminal. For example, the mobile terminal may further include more or fewer components than shown in FIG. 1, or have a different configuration from that shown in FIG. 1.

The memory 104 is configured to store a computer program, for example, a software program and one or more modules of application software, such as a computer program corresponding to the terminal registration processing method in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memories. In some instances, the memory 104 may further include a memory remotely located with respect to processor 102, which may be connected to the mobile terminal over a network. Examples of such network include, but are not limited to, the Internet, the intranet, a local area network, a mobile communication network, or combinations thereof.

The transmission device 106 is configured to receive or transmit data via a network. Specific examples of the described network may include a wireless network provided by a communication provider of the mobile terminal. In one example, the transmission device 106 may include a Network Interface Controller (NIC) that may be coupled to other network devices via a base station to communicate with the Internet. In one example, the transmission device 106 may be a Radio Frequency (RF) module for communicating wirelessly with the Internet.

Figure 2:
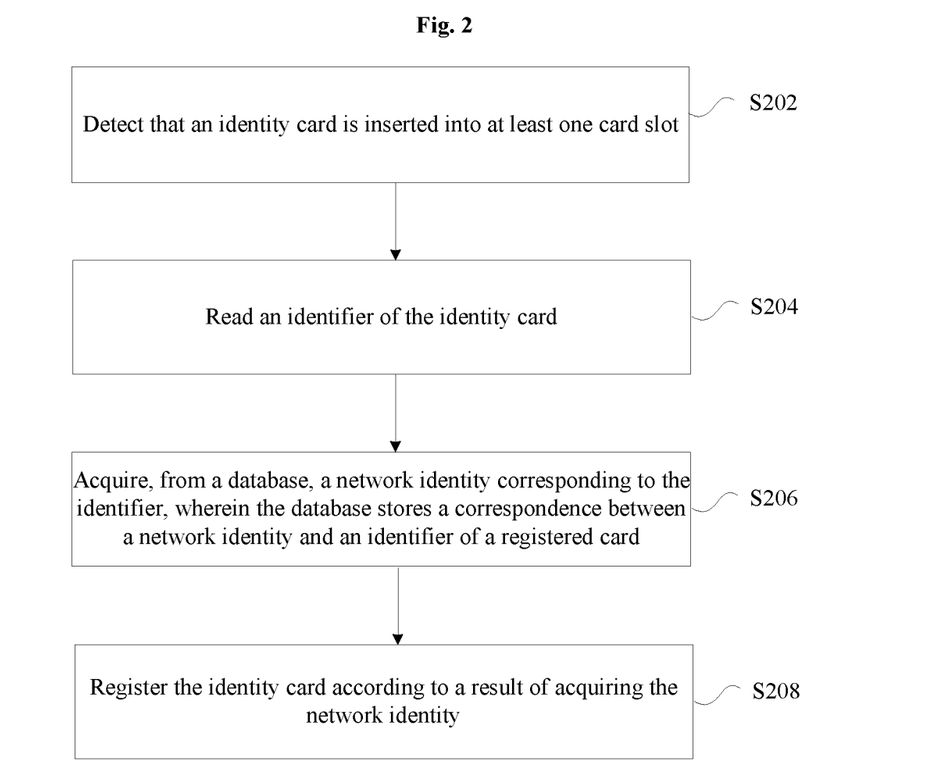
FIG. 2 is a flowchart of a terminal registration processing method according to an embodiment of the present disclosure.

In this embodiment, a terminal registration processing method running in the above mobile terminal or network architecture is provided. FIG. 2 is a flowchart of a terminal registration processing method according to an embodiment of the present disclosure. As shown in FIG. 2, the flow includes operations S202 to S208 which are described in detail below.

At S202, it is detected that an identity card is inserted into at least one card slot.

At S204, an identifier of the identity card is read.

In the embodiment of the present disclosure, the identity card includes a SIM card or a USIM card, and the identifier is an IMSI. For example, for 4G, the identity card is a SIM card. If the IMSI of this SIM card is 001010123456789, and this IMSI is not stored in a database under 4G, then the terminal sends a registration request message that carries the IMSI 001010123456789. For example, for 5G, the identity card is a USIM card. If the IMSI of this USIM card is 001010123456789, a Subscription Concealed Identifier (SUCI) calculated based on a specific algorithm of 5G is 122545245363621122224, and this IMSI 001010123456789 is not stored in the database, then the terminal sends a registration request message that carries the SUCI 122545245363621122224, and after receiving the SUCI 122545245363621122224, the network side performs reverse decryption and restores the SUCI 122545245363621122224 to the IMSI 001010123456789.

At S206, a network identity corresponding to the identifier is acquired from a database, wherein the database stores a correspondence between a network identity and an identifier of a registered card.

In the embodiment of the present disclosure, in a case where the identity card is the SIM card, the identifier is an IMSI, and the network identity includes a GUTI and a KSI; and in a case where the identity card is the USIM card, the identifier is an SUCI, and the network identity includes a 5G-GUTI and a KSI. In some exemplary implementation, for 4G, the network identity at least includes a GUTI and a KSI; and for 5G, the network identity at least includes a 5G-GUTI and a KSI.

At S208, the identity card is registered according to a result of acquiring the network identity.

In some exemplary implementations, the operation S208 may include the following operations.

In a case where the result indicates that the network identity corresponding to the identifier is successfully acquired, it is determined that the identity card is a registered card, and registration is performed according to the network identity corresponding to the identifier. In some exemplary implementations, a registration request message is sent to a network side, wherein the registration request message carries the network identity corresponding to the identifier.

In a case where the result indicates that the network identity corresponding to the identifier is not successfully acquired, it is determined that the identity card is an unregistered card, and the identity card is registered according to the identifier. In some exemplary implementations, a registration request message is sent to a network side, wherein the registration request message carries the identifier.

In an exemplary embodiment, after the identity card is registered according to the identifier, an network identity allocated by the network side according to the registration request message is received; and a correspondence between the identifier and the network identity allocated by the network side is stored into the database.

The solution provided in the embodiments of the present disclosure can be applied to a 4G and 5G dual-card terminal, and can determine whether a card is really replaced or pseudo-replaced. With regard to a pseudo-card-replacement scenario, unnecessary deletion of important identifier information (including, but not limited to, GUTI, KSI, 5G-GUTI, ngKSI) stored in the terminal is avoided, so that the efficiency and speed of registering the terminal to the network are improved while unnecessary signaling interaction in the network is reduced.

Figure 3:
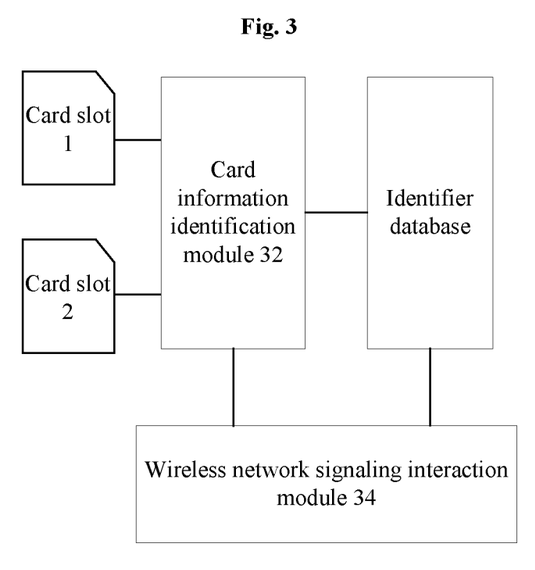
FIG. 3 is a schematic diagram of a multi-card terminal according to an embodiment of the present disclosure.
Figure 4:
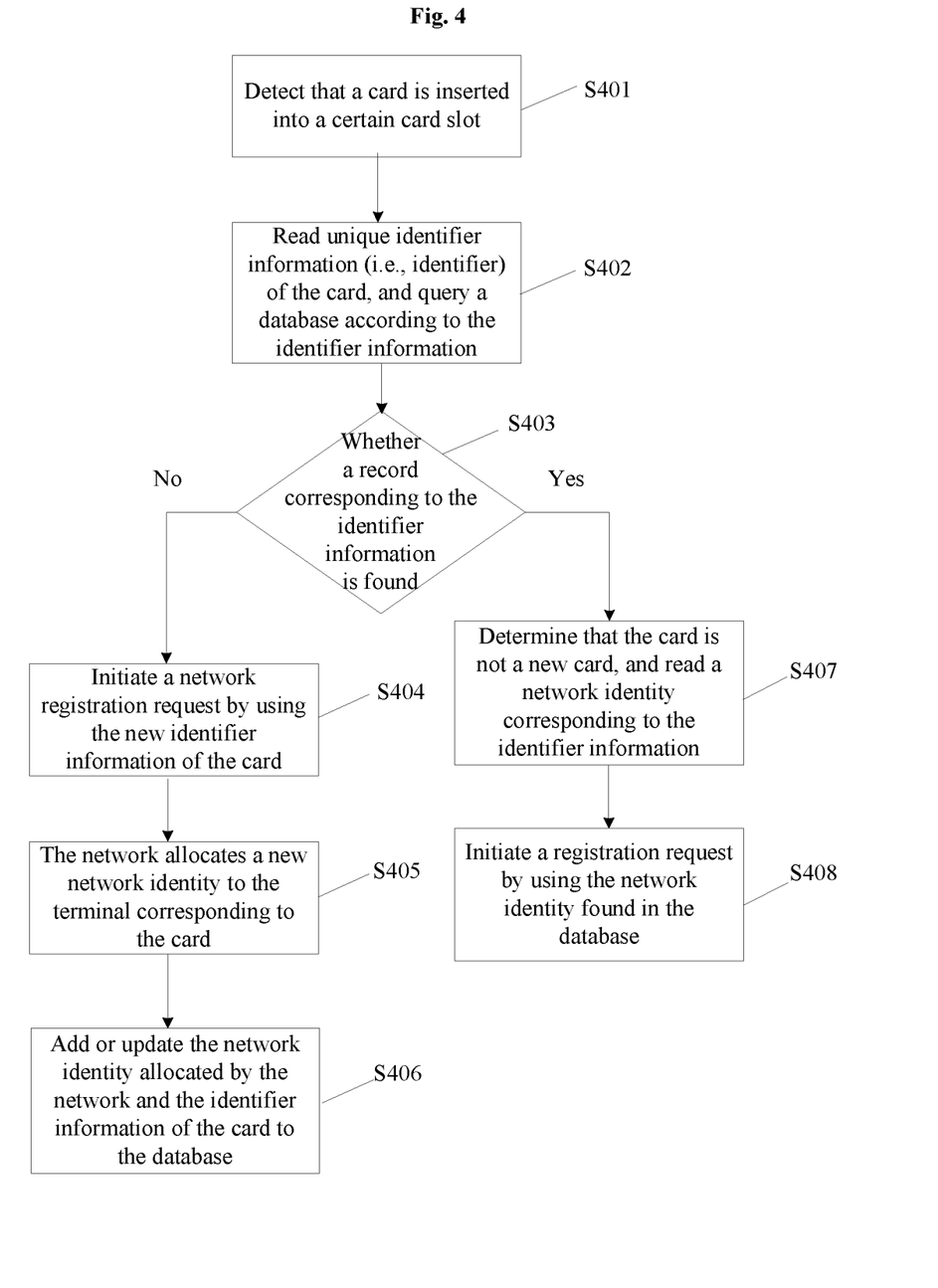
FIG. 4 is a flowchart of registration of a multi-card terminal according to an embodiment of the present disclosure.

FIG. 3 is a schematic diagram of a multi-card terminal according to an embodiment of the present disclosure. As shown in FIG. 3, the multi-card terminal includes a card slot 1, a card slot 2, a card information identification module 32, an identifier database and a wireless network signaling interaction module 34, wherein card slot 1 and card slot 2 are respectively connected to the card information identification module 32, and the card information identification module 32 and the identifier database are both connected to the wireless network signaling interaction module 34. The multi-card terminal supports the insertion of a plurality of USIM cards, and after the registration for the plurality of USIM cards is completed, the terminal maintains a global database for the plurality of USIM cards, the global database stores a unique identifier of each USIM card and a network allocated key identification information. FIG. 4 is a flowchart of registration of a multi-card terminal according to an embodiment of the present disclosure. As shown in FIG. 4, the registration flow includes operations S401 to S408 which are described below in detail.

At S401, it is detected that a card is inserted into a certain card slot.

At S402, unique identifier information (namely, the above identifier) of the card is read, and a database is queried according to the identifier information, such as an IMSI and/or an Integrated Circuit Card Identifier (ICCID).

At S403, it is judged whether a record corresponding to the identifier information is found, and in the case where a judgment result is negative, operation S404 is executed, otherwise, operation S407 is executed.

At S404, a network registration request is initiated by using the new identifier information of the card.

At S405, the network allocates a new network identity to the terminal corresponding to the card.

At S406, the network identity allocated by the network and the identifier information of the card are added and updated to the database.

At S407, it is determined that the card is not a new card, and a network identity corresponding to the identifier information is read.

At S408, a registration request is initiated by using the network identity found in the database.

The embodiments of the present disclosure will be described in detail below by way of specific examples.

Example 1

A user only exchanges positions of two cards, and the registration process specifically includes operations 1-3 which are described in detail below.

At operation 1, it is assumed that card slot 1 originally corresponds to card serial number 1, and card slot 2 originally corresponds to card serial number 2. After taking out the cards, the user places the cards back into the card slots in a reverse order accidentally, that is, card slot 1 corresponds to card serial number 2, and card slot 2 corresponds to card serial number 1.

At operation 2, when it is detected that the two cards are inserted into the terminal, the terminal reads ICCIDs and IMSIs of the USIM cards respectively, and finds that records for both USIM cards can be found from the database. In this case, both USIM cards corresponding to card slot 1 and card slot 2 have 4G and 5G related network identity records in the database.

At operation 3, the terminal selects the 4G or 5G network identity stored in the database according to its own network system configuration, and sends a registration request to the network (namely, corresponding to GUTI, 5G-GUTI, KSI, ngKSI, etc.).

Example 2

A user replaces one of the cards with a card that has previously been used before, and the registration process includes operations 1-4 which are described in detail below.

At operation 1, it is assumed that card slot 1 originally corresponds to card serial number 1 and card slot 2 originally corresponds to card serial number 2. The user takes out the card in card slot 2 and replaces with a card having a card serial number 3. The card having the card serial number 3 has previously been used in the terminal, and has successfully been registered to 5G but has not been registered to 4G (i.e., the identifier for 4G is NA).

At operation 2, after detecting that the card is inserted, the terminal reads ICCIDs and IMSIs of the USIM cards respectively, and finds that records for both USIM cards can be found from the database. The USIM card corresponding to card slot 1 has 4G and 5G related network identity records in the database. The USIM card having the card serial number 3 and corresponding to card slot 2 only has a 5G related network identity record in the database.

At operation 3, for the card in card slot 1, the terminal selects the 4G or 5G network identity stored in the database according to its own network system configuration, and sends a registration request to the network. For the card in card slot 2, if the user selects to register the card in 5G, the terminal directly initiates the registration according to the 5G network identity in the database; and if the user selects to register the card in 4G, the terminal calculates a corresponding 4G network identity according to the 5G network identity in the database by using a 3GPP algorithm (the calculation may be performed according to the related art, which is not described herein) and initiates the registration to the network according to the calculated 4G network identity.

At operation 4, after card slot 2 is successfully registered, if a new network identity is allocated by the network, the 4G network identity of the card having the card serial number 3 is updated.

Example 3

A user replaces one of the cards with a card which has never been used, and the registration process includes operations 1-4 which are described in detail below.

At operation 1, it is assumed that card slot 1 originally corresponds to card serial number 1, and card slot 2 originally corresponds to card serial number 2. The user takes out the card in card slot 2 and replaces with a card having a card serial number 5, wherein the ICCID corresponding to the card serial number 5 is 8986005555555555555, and the IMSI corresponding to the card serial number 5 is 46001555555555.

At operation 2, after detecting that the card is inserted, the terminal reads ICCIDs and IMSIs of the USIM cards respectively, and finds in the database a 4G and 5G related network identity record for the USIM card corresponding to card slot 1, but finds no record in the database based on the IMSI and the ICCID corresponding to the USIM card having the card serial number 5 in card slot 2.

At operation 3, for the card in card slot 1, the terminal selects the 4G or 5G network identity stored in the database according to its own network system configuration, and sends a registration request to the network. For the card in card slot 2, the terminal can only initiates registration by using the identifier (including but not limited to IMSI, SUCI, etc.) of the new card, so as to request the network to allocate a new 4G/5G network identity.

At operation 4, after card slot 2 is successfully registered, if a new network identity is allocated by the network, the 4G network identity of the card having the card serial number 5 is added.

In the embodiments of the present disclosure, under the premise of not changing the 5G terminal and network hardware, optimal user experience is achieved at a minimum cost, and the burden introduced to the network in re-allocating a network identity is reduced to a minimum extent, so that the load of the network can be reduced. Unnecessary network identity re-allocation is avoided to the maximum extent from the perspective of the terminal, and the success rate and speed of registration can also be improved.

Through the description of the foregoing embodiments, a person having ordinary skill in the art can clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solution of the embodiments of the present disclosure or the part contributing to the prior art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the method described in the embodiments of the present disclosure.

A terminal registration processing device is also provided in the embodiments of the present disclosure. The device is used for implementing the described embodiments and exemplary implementations, and what has been described will not be elaborated. The term "module", as used hereinafter, is a combination of software and/or hardware capable of realizing a predetermined function. Although the device described in the following embodiments is preferably implemented by software, implementation of hardware or a combination of software and hardware is also possible and conceived.

Figure 5:
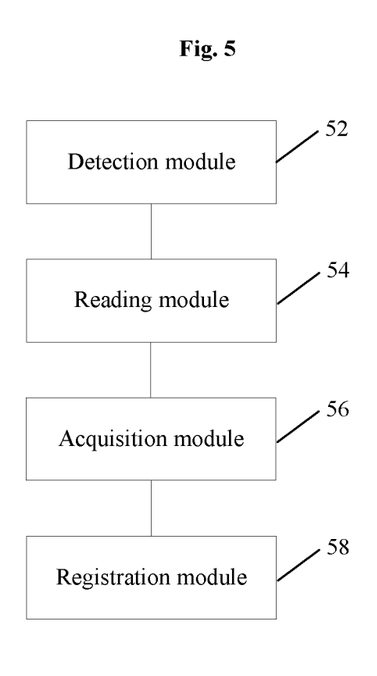
FIG. 5 is a block diagram of a terminal registration processing device according to an embodiment of the present disclosure.

FIG. 5 is a block diagram of a terminal registration processing device according to an embodiment of the present disclosure. As shown in FIG. 5, the device includes:
- a detection module 52, configured to detect that an identity card is inserted into at least one card slot;
- a reading module 54, configured to read an identifier of the identity card;
- an acquisition module 56, configured to acquire, from a database, a network identity corresponding to the identifier, wherein the database stores a correspondence between a network identity and an identifier of a registered card; and
- a registration module 58, configured to register the identity card according to a result of acquiring the network identity.

In at least one exemplary implementation of the embodiment, the registration module 58 includes:
- a first registration sub-module, configured to, in a case where the result indicates that the network identity corresponding to the identifier is successfully acquired, determine that the identity card is a registered card, and register the identity card according to the network identity corresponding to the identifier; and/or,
- a second registration sub-module, configured to, in a case where the result indicates that the network identity corresponding to the identifier is not successfully acquired, determine that the identity card is an unregistered card, and register the identity card according to the identifier.

In at least one exemplary implementation of the embodiment, the first registration sub-module is further configured to:
- send a registration request message to a network side, wherein the registration request message carries the network identity corresponding to the identifier.

In at least one exemplary implementation of the embodiment, the second registration sub-module is further configured to:
- send a registration request message to a network side, wherein the registration request message carries the identifier.

In at least one exemplary implementation of the embodiment, the device further includes:
- a receiving module, configured to receive an network identity allocated by the network side according to the registration request message; and
- a storing module, configured to store, into the database, a correspondence between the identifier and the network identity allocated by the network side.

In at least one exemplary implementation of the embodiment, the identity card includes a SIM card or a USIM card.

In at least one exemplary implementation of the embodiment, the identifier is an IMSI.

In a case where the identity card is the SIM card, the network identity includes a GUTI and a KSI.

In a case where the identity card is the USIM card, the identifier is an SUCI, and the network identity includes a 5G-GUTI and a KSI.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, wherein the computer program is configured to execute the operations in any one of the method embodiments at runtime.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure also provide an electronic device, including a memory and a processor, wherein the memory stores a computer program, and the processor is configured to run the computer program so as to execute the operations in any one of the method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the present disclosure may be implemented by a universal computing device, and the modules or operations may be concentrated on a single computing device or distributed on a network formed by a plurality of computing devices. The modules or operations may be implemented by program codes executable for the computing devices, so that the modules or operations may be stored in a storage device for execution by the computing devices. The shown or described operations may be executed in sequences different from those described here in some cases, or may form each integrated circuit module respectively, or multiple modules or operations therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

INDUSTRIAL APPLICABILITY

The embodiments of the present disclosure are applied to the field of communications, can solve the problem in the related art that in a pseudo-card-replacement scenario of a dual-card terminal or a multi-card terminal, a registration process of new cards is adopted to request the network to allocate all identifiers, which increases burden on the network. For the pseudo-card-replacement scenario, a network identity of a registered identity card is stored, thereby reducing unnecessary signaling interaction in a network, and increasing efficiency and speed of registering a terminal to the network.

What is claimed is:

1. A terminal registration processing method, comprising:
    detecting that an identity card is inserted into a card slot, wherein the identity card comprises a Subscriber Identity Module (SIM) card or a Universal Mobile Telecommunications System (UMTS) Subscriber Identity Module (USIM) card;
    reading an identifier of the identity card;
    acquiring, from a database, a network identity corresponding to the identifier, wherein the database stores a correspondence between a network identity and an identifier of a registered card; and
    registering the identity card according to a result of acquiring the network identity,
    wherein:
    the identifier is an International Mobile Subscriber Identity (IMSI);
    in a case where the identity card is the SIM card, the network identity comprises a Globally Unique Temporary Identity (GUTI) and a Key Set Identifier (KSI); and
    in a case where the identity card is the USIM card, the network identity comprises a Fifth Generation-GUTI (5G-GUTI) and a KSI.

2. The method according to claim 1, wherein registering the identity card according to the result of acquiring the network identity comprises:
    in a case where the result indicates that the network identity corresponding to the identifier is successfully acquired, determining that the identity card is a registered card, and registering the identity card according to the network identity corresponding to the identifier.

3. The method according to claim 2, wherein registering the identity card according to the network identity corresponding to the identifier comprises:
    sending a registration request message to a network side, wherein the registration request message carries the network identity corresponding to the identifier.

4. A terminal registration processing device, comprising a memory storing instructions and a processor in communication with the memory, wherein the processor is configured to execute the instructions to:
    detect that an identity card is inserted into a card slot, wherein the identity card comprises a Subscriber Identity Module (SIM) card or a Universal Mobile Telecommunications System (UMTS) Subscriber Identity Module (USIM) card;
    read an identifier of the identity card;
    acquire, from a database, a network identity corresponding to the identifier, wherein the database stores a correspondence between a network identity and an identifier of a registered card; and
    register the identity card according to a result of acquiring the network identity,
    wherein:
    the identifier is an International Mobile Subscriber Identity (IMSI);
    in a case where the identity card is the SIM card, the network identity comprises a Globally Unique Temporary Identity (GUTI) and a Key Set Identifier (KSI); and
    in a case where the identity card is the USIM card, the network identity comprises a Fifth Generation-GUTI (5G-GUTI) and a KSI.

5. A non-transitory computer-readable storage medium, wherein the computer-readable storage medium stores a computer program, and the computer program is configured to execute the method according to claim 1 at runtime.

6. The method according to claim 1, wherein registering the identity card according to the result of acquiring the network identity comprises:
    in a case where the result indicates that the network identity corresponding to the identifier is not successfully acquired, determining that the identity card is an unregistered card, and registering the identity card according to the identifier.

7. The method according to claim 6, wherein registering the identity card according to the identifier comprises:
    sending a registration request message to a network side, wherein the registration request message carries the identifier.

8. The method according to claim 7, wherein after registering the identity card according to the identifier, the method further comprises:
    receiving an network identity allocated by the network side according to the registration request message; and
    storing, into the database, a correspondence between the identifier and the network identity allocated by the network side.

9. The method according to claim 6, wherein in a case where the identity card is the SIM card, registering the identity card according to the identifier comprises:
    sending a registration request message to a network side, wherein the registration request message carries the IMSI.

10. The method according to claim 6, wherein in a case where the identity card is the USIM card, registering the identity card according to the identifier comprises:
    calculating a Subscription Concealed Identifier (SUCI) according to the IMSI based on a specific algorithm of 5G; and sending a registration request message to a network side, wherein the registration request message carries the SUCI.

11. The method according to claim 2, wherein the network identity corresponding to the identifier comprises a 5G network identity or a 4G network identity.

12. The method according to claim 11, wherein in a case where the network identity corresponding to the identifier comprises the 5G network identity, registering the identity card according to the network identity corresponding to the identifier comprises:

sending a registration request message to a network side, wherein the registration request message carries the 5G network identity corresponding to the identifier.

13. The method according to claim 11, wherein in a case where the network identity corresponding to the identifier comprises the 5G network identity, registering the identity card according to the network identity corresponding to the identifier comprises:

calculating a 4G network identity according to the 5G network identity; and sending a registration request message to a network side, wherein the registration request message carries the 4G network identity corresponding to the identifier.

14. The device according to claim 4, wherein the processor, when being configured to execute the instructions to register the identity card according to the result of acquiring the network identity, is configured to execute the instructions to:

in a case where the result indicates that the network identity corresponding to the identifier is successfully acquired, determine that the identity card is a registered card, and register the identity card according to the network identity corresponding to the identifier.

15. The device according to claim 14, wherein the processor, when being configured to execute the instructions to register the identity card according to the network identity corresponding to the identifier, is configured to execute the instructions to:

send a registration request message to a network side, wherein the registration request message carries the network identity corresponding to the identifier.

16. The device according to claim 4, wherein the processor, when being configured to execute the instructions to register the identity card according to the result of acquiring the network identity, is configured to execute the instructions to:

in a case where the result indicates that the network identity corresponding to the identifier is not successfully acquired, determine that the identity card is an unregistered card, and register the identity card according to the identifier.

17. The device according to claim 16, wherein the processor, when being configured to execute the instructions to register the identity card according to the identifier, is configured to execute the instructions to:

send a registration request message to a network side, wherein the registration request message carries the identifier.

18. The device according to claim 17, wherein the processor is further configured to execute the instructions to:

receive an network identity allocated by the network side according to the registration request message; and store, into the database, a correspondence between the identifier and the network identity allocated by the network side.

* * * * *